United States Patent
Brook et al.

[15] 3,679,721
[45] July 25, 1972

[54] TITANIUM COMPOUNDS

[72] Inventors: David Whiteley Brook, Teesside; Raymond Ward, Coxhoe, both of England

[73] Assignee: British Titan Products Company Limited, Durham, England

[22] Filed: March 9, 1970

[21] Appl. No.: 17,939

[30] Foreign Application Priority Data

March 18, 1969 Great Britain ...................... 14,048/69

[52] U.S. Cl. ........................ 260/429.5, 106/300, 106/308 Q
[51] Int. Cl. ........................................................... C07f 7/28
[58] Field of Search ............................................. 260/429.5

[56] References Cited

UNITED STATES PATENTS

| | | | |
|---|---|---|---|
| 2,643,262 | 6/1953 | Bostwick | 260/429.5 |
| 2,894,966 | 7/1959 | Russell | 260/429.5 |
| 2,920,089 | 1/1960 | Samour | 260/429.5 |
| 3,028,297 | 4/1962 | Legally | 260/429.5 X |

OTHER PUBLICATIONS

Chemical Abstracts, Vol. 52, pg. 6673h (1958)
Chemical Abstracts, Vol. 68, 56105, (1968)

*Primary Examiner*—Tobias E. Levow
*Assistant Examiner*—H. M. S. Sneed
*Attorney*—Birch, Swindler, McKie & Beckett

[57] ABSTRACT

A titanium chelate which is the reaction product of either ethylene glycol, propylene glycol or diethylene glycol or of mixtures thereof with monoethanolamine and a titanium orthoester. The chelate is of use in producing stable suspensions of titanium dioxide in water.

6 Claims, No Drawings

TITANIUM COMPOUNDS

This invention relates to titanium compounds and particularly to titanium chelates which are suitable for use for forming gels in aqueous media or for use as dispersants or suspending agents for materials in aqueous media.

The formation of chelates from organic titanium orthoesters with a number of compounds is known. For instance, it is known to produce chelates from alkanolamines and titanium orthoesters and that such compounds produce a gel when mixed with aqueous media. However, it has been observed that a chelate prepared from monoethanolamine and a titanium orthoester is unstable when mixed with water in that it precipitates a hydrous form of titanium dioxide and is too reactive for use to produce stable gels.

Accordingly, a titanium chelate comprises the reaction product of ethylene glycol, propylene glycol or diethylene glycol and monoethanolamine and a titanium orthoester.

It has been found that the chelates prepared from monoethanolamine, titanium orthoester and ethylene glycol, propylene glycol or diethylene glycol are substantially water stable over a wide range of composition and can be used to form gels in aqueous media or as dispersants and suspending agents economically.

Generally, the stability of the titanium chelate obtained depends on the ratio of a number of moles of Ti to the total number of moles of chelating agent (i.e., monoethanolamine plus the glycol) contained in the chelate and the higher this ratio the stronger is the gelling effect of the chelate in aqueous media. Nevertheless, at a high ratio the water stability of the chelate is impaired in the sense that it partially hydrolyzes and precipitates some hydrous titanium dioxide. In addition the gelling effect is affected by the proportion of monoethanolamine to the glycol, for instance the higher the molar ratio of monoethanolamine to the glycol the less the chelate is stable to hydrolysis but the greater its effectiveness as a gelling agent.

Preferably the ratio of the number of moles of the chelating agent (i.e., monoethanolamine plus the glycol) to the number of moles of Ti is from 4:1 to 1:1, and more preferably from 4:1 to 2.5:1. Preferably the ratio of the number of moles of monoethanolamine to the glycol is from 1:1 to 1:3.

One of the most preferable compositions is that containing monoethanolamine, the glycol and titanium orthoester in the molar ratio 1:2:1. Naturally, proportions varying slightly from this preferred ratio also give extremely satisfactory products.

The titanium orthoester which is employed to form the chelates according to the present invention are generally those having the formula $Ti(OR)_4$ in which the R group is an alkyl group containing from two to 10 carbon atoms, preferably two to four carbon atoms. In the general formula quoted $Ti(OR)_4$, the R groups can be the same or different. Typical examples of titanium orthoesters having this general formula are titanium tetraisopropoxide, titanium tetrabutoxide and titanium tetrahexoxide.

The chelates of the present invention can be prepared in a number of ways, for example by mixing the glycol and the monoethanolamine in the desired proportions followed by the addition of the titanium orthoester. If desired, either the monoethanolamine or the glycol can firstly be mixed with the titanium orthoester followed by the addition of the other ingredient.

The chelates of the present invention are particularly suitable for use in forming a gel in aqueous media. For instance, when mixed with water, a gel is formed which usually will be substantially free of any precipitated hydrous titanium dioxide.

When the titanium to chelating agent ratio is low, the time required for formation of the gel may be longer than with chelates where Ti : chelating agent ratio is higher. In this manner, an excellent degree of control in gelation time can be obtained. Low concentrations of active material tend to give the softer type of gel.

The chelates of the present invention can be used as dispersants to stabilize slurries containing a relatively high proportion of a dispersed solid. For instance, the pre-formed chelate may be added to an aqueous dispersion of titanium dioxide pigment to act as a dispersant and stabilizing agent for the titanium dioxide pigment to maintain it in its dispersed form throughout the aqueous medium in a relatively high concentration. In this case, a gel is not truly formed in the mixture unless the proportion of the chelate is sufficient to effect this. The proportion of the chelate employed to obtain a dispersed and stable suspension depends on a number of factors, for instance on the type of chelate, on the amount of material to be dispersed and on its type. But with suspensions of titanium dioxide pigments it has been discovered that only a small proportion of the preferred chelates, say from 0.2 to 2 percent by weight of the suspension is required. The suspension is in a form readily amenable to mixing with further ingredients such as those, for example, to be added to an aqueous titanium dioxide suspension or slurry for forming into an aqueous emulsion paint. Such a further ingredient would be, for example, a film-forming polymer to act as a binder for the paint.

The titanium chelates of this invention can also be used to stabilize suspensions or dispersions in aqueous media of oils, fats and waxes, typical examples being the waxes used in polishes. Such products, by suitable choice and concentration of titanium chelate, can be rendered thixotropic in nature, with consequent advantages and ease in their method of application and use.

The chelates according to the present invention can contain either one or more of the glycols referred to previously. For instance, the chelates can comprise a reaction product of monoethanolamine, ethylene glycol, and propylene glycol together with the titanium orthoester.

The gels formed can be either strong and rigid and only broken down by the application of a relatively strong shearing force, or weak and reversible. The type depends on the type and concentration of the chelating agent used. The soft gels are usually reversible, that is, when the gel is broken down, a liquid is formed which has roughly the same viscosity as the original system. On standing, the gel will reform.

The invention is described in the following examples:

EXAMPLE 1

Into a round bottomed flask fitted with a stirrer, thermometer and water cooled condenser was placed a mixture of 92 grams monoethanolamine and 186 grams of ethylene glycol. To the well stirred mixture was added slowly 426 grams of tetraisopropyl titanate. The apparatus used to contain the titanium ester was suitably protected against the ingress of moisture. Heat was evolved during the reaction. When the reaction had ceased, the titanium chelate product was obtained as a pale yellow liquid which was then allowed to cool.

Twenty grams of the chelate were added with stirring to 80 mls. of water. A clear colorless solution was obtained which set to a rigid transparent gel within 5 minutes. This gelling action took place at normal room temperature.

A highly concentrated slurry was prepared by dispersing 650 grams of an anatase titanium dioxide pigment in 350 grams of water containing as a dispersant 2.5 grams of calgon. To a 250 gram portion of the solution so prepared was added 2.5 grams of the chelate. A similar 250 gram portion of this slurry was stirred without the addition of the chelate. After standing for 24 hours the untreated slurry had partly settled forming a hard layer on the bottom of the container which was found difficult to redisperse. The slurry which had been treated with the chelate had set to a soft reversible gel in which no sedimentation of the dispersed titanium dioxide pigment had occurred. It was observed that the gel could be broken easily by stirring but reformed on standing. Standing for a further 50 days produced no sedimentation.

A further 250 gram portion of the titanium dioxide was treated with 1.25 grams of the chelate. After standing for 48 hours it was observed that little or no gel had been formed but the pigment was still dispersed throughout the slurry and no sedimentation had taken place.

EXAMPLE 2

A titanium ester chelate was prepared according to the method described in Example 1 but using 340 grams of tetrabutyl titanate, 61 grams of monoethanolamine and 152 grams propylene glycol. The titanium chelate product obtained was a yellow solution with a strong odor of butanol.

Twenty grams of the chelate was mixed with stirring with 80 mls. of water to give a clear colorless solution which set to a firm gel within 2 minutes.

A highly concentrated slurry was made by dispersing 680 grams of rutile titanium dioxide pigment in 320 grams of water by employing 3.5 grams of calgon as a dispersing agent. To a 300 gram portion of this slurry was added 1.5 grams of the chelate and the slurry formed a gel within 3 hours which was free of sedimentation even after being stored for 50 days. A similar portion of the slurry but without any of the added titanium chelate exhibited a substantial degree of sedimentation after only 48 hours' storing.

EXAMPLE 3

Various titanium chelates were prepared according to the method described in Example 1 from tetraisopropyl titanate (TIPT), tetra-normal-butyl titanate (TNBT), monoethanolamine (MEA) and ethylene glycol, propylene glycol or diethylene glycol.

The various chelates were tested for their gelling time in a 20 percent aqueous solution and the results together with details of the particular reactants used are given in the following table.

TABLE

| Titanium Ester Name (Moles) | MEA (Moles) | Glycol Name (Moles) | Gelling time (Mins.) | Remarks |
|---|---|---|---|---|
| TIPT | | Ethylene | | |
| 1 | 1 | 2 | 2 | |
| 2 | 1 | 4 | 5 secs. | |
| 1 | 1 | 3 | 120 | |
| TNBT | | | | |
| 1 | 1 | 2 | 5 | |
| 1 | 1 | 3 | 60 | |
| TIPT | | Propylene | | |
| 1 | 1 | 2 | 5 | |
| 1 | 1 | 3 | 180 | |
| 2 | 1 | 3 | 24 hrs. | Slight pptn.* |
| 1 | 2 | 1 | 2 | Slight pptn.* |
| TNBT | | | | |
| 1 | 1 | 2 | 2 | |
| 1 | 1 | 3 | 60 | |
| TIPT | | Diethylene | | |
| 1 | 1 | 3 | 120 | With white ppt.¹ |
| 2 | 2 | 5 | 120 | With some pptn.* |

* pptn. = precipitation;
¹ ppt. = precipitate

What is claimed is

1. A titanium chelate comprising the reaction product of monoethanolamine, a titanium orthoester having the formula $Ti(OR)_4$ in which the R group is an alkyl group containing from two to 10 carbon atoms, and at least one glycol selected from the class consisting of ethylene glycol, propylene glycol and diethylene glycol, the ratio of the total number of moles of monoethanolamine and of the glycol to the total number of moles of Ti being from 4:1 to 1:1.

2. A titanium chelate according to claim 1 in which the said ratio is from 4:1 to 2.5:1.

3. A titanium chelate according to claim 1 in which the ratio of the number of moles of monoethanolamine to the number of moles of the glycol is from 1:1 to 1:3.

4. A titanium chelate according to claim 1 in which the molar ratio of monoethanolamine to glycol to titanium orthoester is 1:2:1.

5. A titanium chelate according to claim 1 in which the R group is an alkyl group containing from two to four carbon atoms.

6. A titanium chelate according to claim 2, wherein the ratio of the number of moles of monoethanolamine to the number of moles of glycol is from 1:1 to 1:3.

* * * * *